United States Patent [19]

Duska

[11] Patent Number: 5,096,957
[45] Date of Patent: Mar. 17, 1992

[54] MOLDING COMPOSITIONS COMPRISING MIXTURES OF WHOLLY AROMATIC POLYESTERS AND FILLERS

[75] Inventor: Joseph J. Duska, Martinez, Ga.

[73] Assignee: Amoco Corporation, Chicago, Ill.

[21] Appl. No.: 409,133

[22] Filed: Sep. 19, 1989

Related U.S. Application Data

[63] Continuation of Ser. No. 60,114, Jun. 9, 1987, abandoned.

[51] Int. Cl.$^5$ .................. C08L 67/03; C08L 67/04
[52] U.S. Cl. .................. 524/434; 524/451; 524/539; 525/444; 525/451
[58] Field of Search ........... 525/444, 451; 524/434, 524/451, 539

[56] References Cited

U.S. PATENT DOCUMENTS

| | | | |
|---|---|---|---|
| 4,267,289 | 5/1981 | Froix | 525/444 |
| 4,414,365 | 11/1983 | Sugimoto | 525/437 |
| 4,563,508 | 1/1986 | Cottis | 525/444 |
| 4,640,961 | 2/1987 | Saito | 525/444 |
| 4,851,480 | 7/1989 | Field | 525/444 |

*Primary Examiner*—Patricia Short
*Attorney, Agent, or Firm*—Jones, Askew & Lunsford

[57] ABSTRACT

This invention relates to molding compositions comprising mixtures of wholly aromatic polyesters and fillers. These compositions can be molded, with minimal processing difficulties, into useful articles, such as ovenware, having good mechanical properties and pleasing visual appearances.

13 Claims, No Drawings

MOLDING COMPOSITIONS COMPRISING MIXTURES OF WHOLLY AROMATIC POLYESTERS AND FILLERS

This is a continuation of application Ser. No. 060,114, filed June 9, 1987, now abandoned.

This invention relates to molding compositions. More particularly, this invention relates to molding compositions comprising mixtures of wholly aromatic polyesters and fillers.

Wholly aromatic polyesters are well known in the prior art, such as Cottis et al. U.S. Pat. No. 3,637,595. Because of their good properties at high temperatures, these polyesters are useful for molding articles which are exposed to high temperatures, such as ovenware.

However, these wholly aromatic polyesters are frequently difficult to process. For example, these polyesters tend to have a "narrow processing window". That is, for the production of an acceptable molded part, the ranges for certain conditions (temperature, pressure, injection speed, etc.) during the molding operation are more narrow than is desirable. A flow modifier (see Cottis et al. U.S. Pat. No. 4,563,508) is often used as a processing aid in conjunction with the polyesters.

Therefore, a need exists for molding compositions which will retain the good properties at high temperatures, but minimize the processing difficulties, of wholly aromatic polyesters.

Accordingly, an object of this invention is to provide molding compositions.

Another object of this invention is to provide molding compositions which can be readily molded into useful articles having good properties (such as high impact strength, low blister rating and pleasing visual appearance).

Another object of this invention is to provide molding compositions which comprise wholly aromatic polyesters and fillers and which have good properties at high temperatures.

Another object of this invention is to provide molding compositions having desirable melt flow rates and which comprise a mixture of wholly aromatic polyesters and fillers.

Still another object of this invention is to provide molding compositions which can be processed with a minimum of processing difficulties.

These and other objects, features and advantages of this invention will become apparent from the following detailed description.

I have surprisingly found that wholly aromatic polyesters, each having good properties at high temperatures but each being difficult to process, and fillers can be mixed to provide molding compositions which show a significant improvement in processability. Ovenware articles, which are molded from these compositions, retain the good high temperature properties of the wholly aromatic polyesters and, therefore, can be used in conventional and microwave ovens.

In accordance with the present invention, molding compositions are provided which comprise a mixture of:

A. from about 10 to about 70 percent, by weight, of a filler material;

B. from about 30 to about 90 percent, by weight, of a polyester component comprising a mixture of:

(1) a first wholly aromatic polyester having a compressive flow value of at least 25 and comprising repeating units derived from terephthalic acid, p-hydroxybenzoic acid and 4,4'-biphenol; and (2) a second wholly aromatic polyester having a compressive flow value of 25-100 and comprising repeating units derived from terephthalic acid, p-hydroxybenzoic acid and 4,4'-biphenol; and C. from 0 to about 20 percent, by weight, of a polymeric flow modifier comprising repeating units derived from isophthalic acid, p-hydroxybenzoic acid and 4,4'-biphenol;

wherein the molar amount of p-hydroxybenzoic acid in the second polyester is higher than in the first polyester.

The molding compositions provided by this invention can be molded by conventional injection molding techniques into useful articles, such as ovenware.

This invention provides a mixture of at least two different wholly aromatic polyesters (designated as the first and second polyesters). Each of these polyesters has a melting temperature in excess of 300° C. and is prepared by reacting terephthalic acid, p-hydroxybenzoic acid and 4,4'-biphenol.

Although the first and second polyesters may be prepared from identical reactants, the molar ratios of reactants are different. In the first polyester, the molar ratios of terephthalic acid: p-hydroxybenzoic acid: 4,4'-biphenol are 1:1.5-2.5:1. In the second polyester, the molar ratios of terephthalic acid: p-hydroxybenzoic acid: 4,4'-biphenol are 1:3.0-4.0:1. With regard to these molar ratios, the numerical value for the p-hydroxybenzoic acid reactant in the second polyester is at least 0.5 (preferably 1.0) higher than in the first polyester.

The first polyester preferably is prepared from about 25 mole percent of terephthalic acid, about 50 mole percent of p-hydroxybenzoic acid and about 25 mole percent of 4,4'-biphenol. The second polyester preferably is prepared from about 17.5 mole percent of terephthalic acid, about 65 mole percent of p-hydroxybenzoic acid and about 17.5 mole percent of 4,4'-biphenol.

The molding compositions of this invention contain from about 30 to about 90 percent, by weight, of the polyester mixture, which is comprised of two or more wholly aromatic polyesters. With regard to a mixture comprising two polyesters, the mixture contains from about 10 to about 90 percent (preferably about 10 to about 50 percent), by weight, of the first polyester and from about 10 to about 90 (preferably about 50 to about 90 percent), by weight, of the second polyester.

The molding compositions of this invention contain one or more filler materials. These fillers are conventional and well known in the art. Examples of suitable fillers are talc, aluminum powder, calcium sulfate, wollastonite, inorganic pigments, inorganic silicates and carbon black. Preferred fillers are talc and titanium dioxide.

A useful range of the filler material in the total composition is from about 10 to 70 percent, by weight. A preferred range is from about 20 to 60 percent.

Additionally, these molding compositions may contain from 0 to about 20 percent, by weight, of a polymeric flow modifier as described earlier in this application; and as described also in Cottis et al. U.S. Pat. No. 4,563,508. A preferred amount of polymeric flow modifier, if present, is from about 1 to about 10 percent, by weight.

All percentages specified in this application are by weight unless otherwise stated.

The terms Melt Flow Rate, Compressive Flow Value, Impact Strength and Blister Rating used in this application are defined as follows:

Melt Flow Rate is determined by ASTM D1238 and refers to the rate of extrusion in grams/10 mins of the molding composition. The conditions under which the molding compositions of this invention are tested is to pass the composition through an 0.0825 inch diameter orifice (which is 0.315 inch in length) under a 5000 gram load at 390° C.

The molding compositions of this invention have a melt flow rate of at least about 2 when measured at 390° C. Preferably, the melt flow rate is at least about 20 at 390° C.

Compressive Flow (CF) is a measure of the flow of a weighed sample when pressed on a Carver press at 5000 pounds. CF is measured from the area of a disc obtained from a sample of powdered material of given weight, usually 0.5 to 1.0 grams, which has been pressed between two parallel plates. In carrying out the determination of this characteristic, a sample is pressed between two sheets of aluminum foil which in turn are backed by chromium plated steel plates 6"×6"×¼". A Carver 2112-X Model No. 150-C hydraulic press modified for 800° F. is used to press the sample. The particular temperature of the press is that indicated in each sample run. The sample material is allowed to stand for five minutes between the plates at holding pressure in order that the temperature of the material can equilibrate with the press temperature. A load of 5000 pounds is then applied for two minutes. The CF is then calculated on the following basis. The area of the pressed molding compound is measured by cutting an aluminum sandwich out of the sample pressed between the two aluminum foil sheets. The aluminum foil has a known area/weight relationship called the foil factor. The area is normalized for the pressure of the applied load and that number is multipled by 100 to give a number greater than 1. The compressive flow is then calculated by means of the following equation:

$$CF = \left[ \frac{\left| \frac{\text{Wt. of circle (sandwhich)} - \frac{\text{wt. of sample}}{\text{Foil wt. factor}}}{\text{Applied load (Kg)} \times \text{wt. of sample}} \times 50 \right|^2}{} \right] \times 100$$

The first wholly aromatic polyester has a CF value of at least 25, while the second wholly aromatic polyester has a CF value in the range of 25–100 (preferably 40–80).

Impact Strength refers to the average height (inches) at which the first crack occurs in a molded part (bowl or lid) according to the following test.

The molded part is placed in a fixture specifically designed to guide the part during the test so that impact always occurs on the same edge of the part. The parts are dropped on a ¼" thick vinyl tile which is mounted to a 8"×8" steel plate. The test starts with a 6" drop of the part in the fixture.

If no cracks occur, the drop height is increased by 6" and the same part is dropped again. This is repeated until the part cracks. The height at which the first crack occurs is recorded. The procedure is repeated for a total of 16 parts.

The average height at which the first crack occurs is calculated and reported.

Blister Rating is a visual determination of the blisters in a molded part (bowl or lid). Sixteen molded parts (bowls or lids) are placed in an oven stabilized at 475° F. The parts are removed after 1½ hours and visually inspected for blisters. Each part is rated for blisters in the following manner:

0—Heavy blisters (many large blisters covering more than half of the surface)
1—Moderate blisters (a few large blisters and/or many small blisters)
2—Slight blisters (3 to 6 small blisters)
3—Very slight blisters (one or two small blisters)
4—No visible blisters The blister ratings for the sixteen parts are averaged and reported.

The molding compositions of this invention can be molded into parts having a Blister Rating of at least about 3.75.

Processability Rating refers to comparative ease in molding parts from the compositions of this invention. Stated another way, the Processability Rating is an indication of the tolerance for certain conditions (temperature, pressure, injection speed, etc.) during the molding process to produce acceptable parts. The rating scale is as follows:

0—failure; cannot process
1—poor; difficult to process; narrow tolerances
2—fair; can be processed acceptably; moderate tolerances
3—excellent; easy to process; wide tolerances The molding compositions of this invention have a Processability Rating of 2–3.

This invention is further illustrated by the following examples which are illustrative of certain embodiments designed to teach those of ordinary skill in the art how to practice this invention and to represent the best mode contemplated for carrying out this invention.

EXAMPLES 1-6

A first wholly aromatic polyester is prepared from 25 mole percent terephthalic acid, 50 mole percent p-hydroxybenzoic acid and 25 mole percent 4,4'-biphenol according to the procedure of Example 1 in Cottis et al. U.S. Pat. No. 4,563,508. This polyester is then ground to an average particle size of approximately 50 mesh.

A second wholly aromatic polyester is prepared by reacting 1638 parts of terephthalic acid, 5039 parts of 4-hydroxybenzoic acid, 1837 parts of 4,4'-biphenol, 6600 parts of acetic anhydride, and 0.5 parts of potassium sulfate. The mixture is heated to 307° C. over a period of 10 hours with distillation of acetic acid, then 6.6 parts of distearyl pentaerythritol diphosphite is added. Heating is continued for 6 minutes to a melt temperature of 310° C. The mixture is transferred to a mechanical mixer that initially is at a temperature of 335° C. and then raised to 350° C. After 9.5 hours of mixing, the contents are cooled to room temperature. During this period, the liquid changes to a solid having a compressive flow of 52. This polyester is then ground to an average particle size of approximately 50 mesh.

A polymeric flow modifier is prepared according to Example 5 of Cottis et al. U.S. Pat. No. 4,563,508, and then similarly ground.

In Examples 1 and 2–5, the first and/or second polyesters, flow modifier, talc and $TiO_2$ are thoroughly mixed in the proportions shown in Table A. The resulting mixture is fed by means of a gravimetric powder feeder into the hopper of a 25 mm. corotating intermeshing vented twin screw extruder. The barrel temperature zones are maintained at 425°–435° C. with a die temperature setting of 390°–400° C. and a vacuum of 15 inches mercury on the vent. The screw speed is 150 rpm, and the total throughput is approximately 15 lbs. per hour. The hot extrudate is pelletized and cooled.

The composition of Example 1a is similarly produced but using a commercial size extruder. The hot extrudate is also pelletized and cooled.

The composition of Example 6 is prepared by mixing 44.1 parts of the 2nd polyester, 5.0 parts of the flow modifier, 6.0 parts of $TiO_2$ and 44.9 parts of talc in a powder mixer. Eighty-five percent, by weight, of this mixture and 15%, by weight, of the Example 1a composition in pellet form are simultaneously fed into a twin screw extruder. In a similar procedure, the hot extrudate is pelletized and cooled.

The pellets are used to form, by conventional injection molding techniques, ovenware bowls and lids which are tested for Blister Rating and Impact Strength. These and other test results are shown in Table A.

| | -continued | |
|---|---|---|
| | $TiO_2$ | 6.0 |

The first polyester component is extruded and pelletized using a procedure similar to that employed for Example 1a. The resulting pellets are then metered simultaneously with the powdered second polyester component into the feed hopper of the extruder. The metered amount of first polyester component is shown in Table B. The extrusion conditions are similar to those employed for Examples 1 and 2–5.

The molding compositions of Examples 16 and 19 are similarly prepared, except that the second polyester component is altered by completely replacing the flow modifier with an equal weight of the second polyester.

Ovenware bowls and lids are injection molded, by conventional techniques, and the various test results are shown in Table B.

TABLE B

| Ex. | CF Value of Second Polyester | First Polyester (%) | 2nd Polyester (%) | Melt Flow Rate (390° C.) | Lids Blister Rating | Lids Impact Strength | Bowls Blister Rating | Bowls Impact Strength | Processability Rating | 1st Polyester Component Metered Amount (%) |
|---|---|---|---|---|---|---|---|---|---|---|
| 7 | 25 | 0 | 44.1 | 0.5 | — | — | — | — | 0 | 0 |
| 8 | 25 | 6.6 | 37.5 | 19 | 4.0 | 68 | — | — | 3 | 15 |
| 9 | 25 | 13.2 | 30.9 | 63 | 4.0 | 56 | — | — | 3 | 30 |
| 10 | 39 | 0 | 44.1 | 1.5 | — | — | 1.4 | 24 | 1-2 | 0 |
| 11 | 39 | 6.6 | 37.5 | 39 | — | — | 4.0 | 40 | 3 | 15 |
| 12 | 52 | 0 | 44.1 | 3.4 | 4.0 | 63 | — | — | 2 | 0 |
| 13 | 52 | 6.6 | 37.5 | greater than 200 | 4.0 | 69 | — | — | 3 | 15 |
| 14 | 54 | 0 | 44.1 | 1.2 | — | — | 2.9 | 36 | 1-2 | 0 |
| 15 | 54 | 6.6 | 37.5 | 106 | — | — | 4.0 | 34 | 3 | 15 |
| 16 | 54 | 17.6 | 29.5 | 49 | — | — | 4.0 | 55 | 3 | 40 |
| 17 | 52 | 0 | 44.1 | 3.5 | — | — | 2.9 | 31 | 1-2 | 0 |
| 18 | 52 | 6.6 | 37.5 | 108 | — | — | 3.9 | 38 | 3 | 15 |
| 19 | 52 | 17.6 | 29.5 | 46 | — | — | 4.0 | 61 | 3 | 40 |

Examples 7–8, 10–11, 12–13, 14–15 and 17–18 illustrate the significant improvements obtained by mixing two wholly aromatic polyesters as compared to a single wholly aromatic polyester.

TABLE A

| Example | First Polyester (%) | Second Polyester (%) | Flow Modifier (%) | Bowl Blister Rating | Bowl Impact Strength | Melt Flow Rate @ 390° C. | Processability Rating |
|---|---|---|---|---|---|---|---|
| 1 | 44.1 | 0 | 5.0 | 4.0 | 25.0 | 2 | 2 |
| 1a | 44.1 | 0 | 5.0 | 2.1 | 21.0 | 98 | 1 |
| 2 | 0 | 44.1 | 5.0 | 4.0 | — | 3.4 | 1 |
| 3 | 6.6 | 37.5 | 5.0 | 4.0 | 24.0 | 77 | 3 |
| 4 | 7.0 | 39.6 | 2.5 | 4.0 | 31.2 | 7.8 | 2 |
| 5 | 7.4 | 41.7 | 0 | 4.0 | 29.3 | 2.7 | 2 |
| 6 | 6.6 | 37.5 | 5.0 | 4.0 | 31.1 | greater than 200 | 3 |

The molding compositions of Examples 1–6 also contain, by weight, 6.0 percent $TiO_2$ 44.9 percent talc. Also in Examples 1–6, the first polyesters have compressive flow values of at least 25, and the second polyesters have compressive flow values of 52.

EXAMPLES 7–19

The first and second wholly aromatic polyesters and flow modifier are prepared using the same general procedures as described for Examples 1–6. In Examples 7–15 and 17–18, the first or second polyester, flow modifier, talc and $TiO_2$ are thoroughly mixed in the proportions shown below:

| Polyester | 44.1 |
|---|---|
| Flow Modifier | 5.0 |
| Talc | 44.9 |

EXAMPLES 20–30

The first and second wholly aromatic polyesters and flow modifier are prepared using the same general procedures as described for Examples 1–6.

The second polyester and any flow modifier are then mixed in a powder mixer. Simultaneously, the first polyester (pelletized) is metered with the mixture into the feed hopper of the extruder. The amount of metered 1st polyester component and the composition of the final product are shown in Table C. Again, the general metering procedure of Example 6 is employed.

While the weight percentages are varied in the second polyester component, the first polyester component is consistent as follows:

| Polyester | 44.1 |
|---|---|
| Talc | 44.9 |
| TiO₂ | 6.0 |
| Flow Modifier | 5.0 |

Ovenware bowls and lids are injection molded, by conventional techniques, and the various test results are shown in Table C.

TABLE C

| Example | Second Polyester (%) | First Polyester (%) | Flow Modifier (%) | Melt Flow Rate 390° C. | Bowls Blister Rating | Bowls Impact Strength | Processability Rating | 1st Polyester Component Metered Amount (%) |
|---|---|---|---|---|---|---|---|---|
| 20 | 44.2 | 4.4 | 0.5 | 1.2 | 3.1 | 43 | 1 | 10 |
| 21 | 41.7 | 6.6 | 0.75 | 2.4 | 2.8 | 19 | 2 | 15 |
| 22 | 37.5 | 6.6 | 5.0 | 14 | 3.6* | 31 | 3 | 15 |
| 23 | 39.3 | 8.8 | 1.0 | 12 | 3.9 | 48 | 3 | 20 |
| 24 | 34.4 | 13.2 | 1.5 | 24 | 4.0 | 44 | 3 | 30 |
| 25 | 29.5 | 17.6 | 2.0 | 45 | 4.0 | 58 | 3 | 40 |
| 26 | 24.6 | 22.0 | 2.5 | 168 | 4.0 | 53 | 3 | 50 |
| 27 | 39.3 | 8.8 | 1.0 | 16 | 4.0 | 48 | 3 | 20 |
| 28 | 38.9 | 8.8 | 1.4 | 61 | 4.0 | 48 | 3 | 20 |
| 29 | 38.5 | 8.8 | 1.8 | 51 | 4.0 | 47 | 3 | 20 |
| 30 | 37.7 | 8.8 | 2.6 | 92 | 4.0 | 38 | 3 | 20 |

In Examples 20–30, the total compositions also contain, by weight, 6.0 percent TiO₂ and 44.9 percent talc. In addition, the 2nd polyesters in Examples 20–30 have compressive values of 56.
*Believed low due to a start-up problem.

The foregoing description relates to certain embodiments of this invention, and modifications or alterations may be made without departing from the spirit and scope of this invention as set forth in the claims.

I claim:

1. A molding composition comprising a mixture of:
   A. from about 10 to about 70 percent, by weight, of a filler material;
   B. from about 30 to about 90 percent, by weight, of a polyester component comprising a mixture of:
      (1) a first wholly aromatic polyester having a compressive flow value of at least 25 and consisting of repeating units derived from terephthalic acid, p-hydroxybenzoic acid and 4,4'-biphenol; and
      (2) a second wholly aromatic polyester having a compressive flow value of 25–100 and consisting of repeating units derived from terephthalic acid, p-hydroxybenzoic acid and 4,4'-biphenol; and
   C. from 0 to about 20 percent, by weight, of a polymeric flow modifier comprising repeating units derived from isophthalic acid, p-hydroxybenzoic acid and 4,4'-biphenol;
   wherein the molar amount of p-hydroxybenzoic acid in the second polyester is higher than in the first polyester.

2. A molding composition as defined by claim 1 wherein the filler material is a combination of talc and titanium dioxide.

3. A molding composition as defined by claim 1 wherein the first wholly aromatic polyester is prepared from about 25 mole percent terephthalic acid, about 50 mole percent p-hydroxybenzoic acid and about 25 mole percent 4,4'-biphenol.

4. A molding composition as defined by claim 1 wherein the second wholly aromatic polyester is prepared from about 17.5 mole percent terephthalic acid, about 65 mole percent p-hydroxybenzoic acid and about 17.5 mole percent 4,4'-biphenol.

5. A molding composition as defined by claim 1 wherein the second wholly aromatic polyester has a compressive flow value of 40–80.

6. A molding composition as defined by claim 1 and having a melt flow rate of at least about 2 at 390° C.

7. Ovenware articles made from a molding composition as defined by claim 1.

8. A molding composition comprising a mixture of
   A. from about 10 to about 50 percent, by weight, of a pelletized first component comprising:
      (1) a filler material;
      (2) a first wholly aromatic polyester having a compressive flow value of at least 25 and consisting of repeating units derived from terephthalic acid, p-hydroxybenzoic acid and 4,4'-biphenol; and
      (3) from 0 to about 20 percent, by weight, of a polymeric flow modifier comprising repeating units derived from isophthalic acid, p-hydroxybenzoic acid and 4,4'-biphenol; and
   B. from about 50 to about 90 percent, by weight, of a pelletized second component comprising:
      (1) a filler material;
      (2) a second wholly aromatic polyester having a compressive flow value of 25–100 and consisting of repeating units derived from terephthalic acid, p-hydroxybenzoic acid and 4,4'-biphenol; and
      (3) from 0 to about 20 percent, by weight, of a polymeric flow modifier comprising repeating units derived from isophthalic acid, p-hydroxybenzoic acid and 4,4'-biphenol;
   wherein the molar amount of p-hydroxybenzoic acid in the second polyester is higher than in the first polyester.

9. A molding composition as defined by claim 1 wherein each filler material is a combination of talc and titanium dioxide.

10. A molding composition comprising a mixture of
    A. from about 10 to about 50 percent, by weight, of a powdered first component comprising:
       (1) a filler material;
       (2) a first wholly aromatic polyester having a compressive flow value of at least 25 and consisting of repeating units derived from terephthalic acid, p-hydroxybenzoic acid and 4,4'-biphenol; and
       (3) from 0 to about 20 percent, by weight, of a polymeric flow modifier comprising repeating units derived from isophthalic acid, p-hydroxybenzoic acid and 4,4'-biphenol; and B. from about 50 to about 90 percent, by weight, of a powdered second component comprising:
  (1) a filler material;
  (2) a second wholly aromatic polyester having a compressive flow value of 25-100 and consisting of repeating units derived from terephthalic acid, p-hydroxybenzoic acid and 4,4'-biphenol; and
  (3) from 0 to about 20 percent, by weight, of a polymeric flow modifier comprising repeating units derived from isophthalic acid, p-hydroxybenzoic acid and 4,4'-biphenol;

wherein the molar amount of p-hydroxybenzoic acid in the second polyester is higher than in the first polyester.

11. A molding composition as defined by claim 10 wherein each filler material is a combination of talc and titanium dioxide.

12. A molding composition comprising a mixture of
A. from about 10 to about 50 percent, by weight, of a pelletized first component comprising:
  (1) a filler material;
  (2) a first wholly aromatic polyester having a compressive flow value of at least 25 and consisting of repeating units derived from terephthalic acid, p-hydroxybenzoic acid and 4,4'-biphenol; and
  (3) from 0 to about 20 percent, by weight, of a polymeric flow modifier comprising repeating units derived from isophthalic acid, p-hydroxybenzoic acid and 4,4'-biphenol; and B. from about 50 to about 90 percent, by weight, of a powdered second component comprising:
  (1) a filler material;
  (2) a second wholly aromatic polyester having a compressive flow value of 25-100 and consisting of repeating units derived from terephthalic acid, p-hydroxybenzoic acid and 4,4'-biphenol; and
  (3) from 0 to about 20 percent, by weight, of a polymeric flow modifier comprising repeating units derived from isophthalic acid, p-hydroxybenzoic acid and 4,4'-biphenol;

wherein the molar amount of p-hydroxybenzoic acid in the second polyester is higher than in the first polyester.

13. A molding composition as defined by claim 12 wherein each filler material is a combination of talc and titanium dioxide.

* * * * *